June 17, 1930.  W. B. GRAY  1,764,868
WINDSHIELD WIPER
Filed Feb. 15, 1928
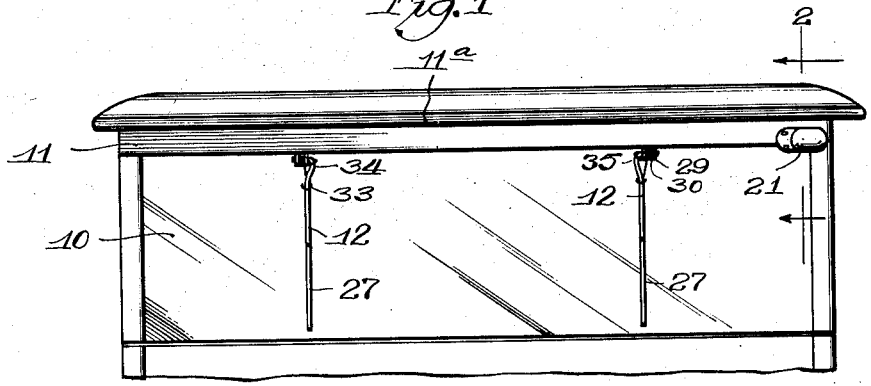
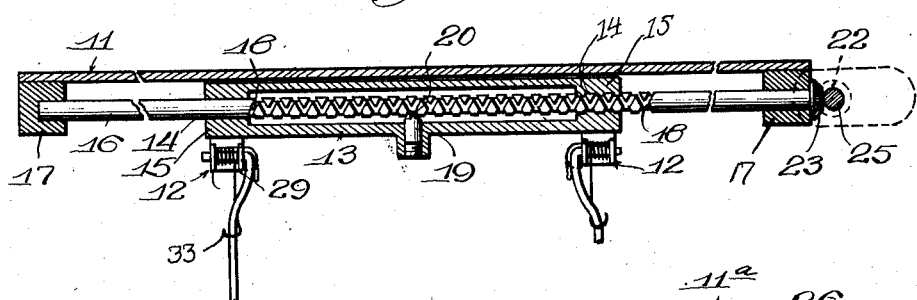
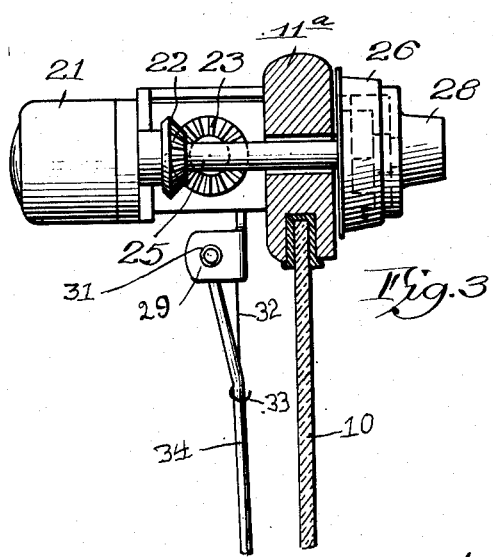
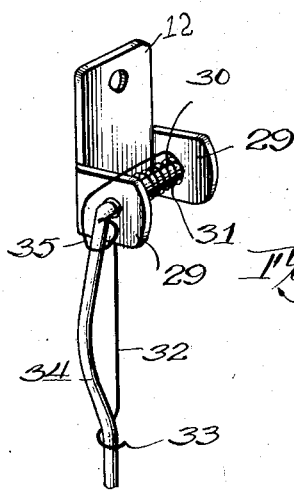
Inventor,
WILLIAM B. GRAY
By M. F. Cargill
Atty.
Witness:
Chas. R. Koursh Patented June 17, 1930

1,764,868

UNITED STATES PATENT OFFICE

WILLIAM B. GRAY, OF CHICAGO, ILLINOIS

WINDSHIELD WIPER

Application filed February 15, 1928. Serial No. 254,464.

This invention relates to improvements in wind shield wipers for automobiles or the like.

The principal object of the invention is to provide an improved wiper operating mechanism having a reciprocable wiper carrier which is provided preferably with two wipers, each of which is adapted to operate over approximately one half the width of the wind shield to provide a belt of clear vision for the driver.

A further object of the invention is to provide an operating mechanism comprising a double threaded shaft, the threads being confined to the middle portion of the shaft.

Another object of the invention is to provide means for holding the wipers in operative position against accidental displacement or loss but permitting the wipers to be detached conveniently for replacement or repair.

A further object of the invention relates to the provision of means for manually operating the wipers from the inside of the wind shield.

Other objects relate to various features of construction and arrangement of parts which will become apparent from a consideration of the following specification and accompanying drawings, wherein:

Figure 1 is a broken front elevation of a motor vehicle showing my improvements attached to the forward side of the wind shield.

Figure 2 is a vertical sectional view through the casing of the wiper mechanism illustrating the threaded shaft and the wiper carrier.

Figure 3 is a vertical sectional view illustrating the motor for driving the mechanism and also the manually operating means.

Figure 4 is a view illustrating a detachable spring retainer member for removably holding the wipers against the wind shield.

In the drawing 10 is the wind shield of a vehicle along the upper edge of which is secured the casing 11 of the operating mechanism. The casing preferably is of sheet metal and has a longitudinal opening along the lower edge or side thereof through which the wiper arms 12, 12 project, these arms being secured to, or being integrally formed with, the carrier 13.

The carrier 13 is approximately one half the width of the wind shield and is provided with openings 14 in its spaced apart heads or ends 15 through which passes the shaft 16. The shaft 16 is suitably journaled in the bearings or end portions 17, 17 of the casing 11.

The shaft 16 is provided with right and left threads as shown, which are connected at their ends by the curved thread portions 18, 18. A plug 19 is carried in a threaded opening in the carrier 13, as shown in Figure 2, which plug has a short projection or spur 20 which extends into the threads of the shaft. From the above description it will be apparent that as the shaft 16 is rotated, the spur 20 will follow the threads and carry with it the carrier 13 and wiper arms 12. When the spur 20 reaches the curved connecting grooves or threads 18 the latter will direct it to the opposite thread and thus the carrier will be reciprocated during the operation of the shaft 16. It will be noted that the heads 15 bear on the shaft 16 in spaced relation and that the spur meshes with the threads at a point mid-way between the heads. This arrangement prevents the shaft from bending or springing away from the spur and assures the operation of the apparatus even under unusual loads as during snow and sleet storms.

The shaft 16 may be rotated by any suitable means but the means herein illustrated is an electric motor 21 as shown in Figures 1 and 2 which may derive its current from the battery of the vehicle. The drive of the motor is effected by bevel gears 22 and 23, the former on the motor shaft and the latter on the end of the shaft 16, as shown clearly in Figure 2.

The motor shaft 25 may suitably extend through the frame 11ª of the wind shield as shown in Figure 3. On the inner end of the shaft 25 is a manually rotatable casing 26 which contains a gear train of any suitable arrangement whereby the rotation of the casing will actuate the shaft 25 and thus shaft 16 for reciprocating the carrier 13. The gear train is preferably so arranged that a single rotation of casing 26 will effect a complete stroke, or nearly a complete stroke of the carrier, and thus also of the wipers 27 carried by the arms 12. A smaller knob 28 may be provided on the end of the shaft 25 for directly rotating the latter when, due to the accumulation of ice or snow on the wind shield or in other emergencies, the load is too great for operation by the motor or by the means of the casing 26.

The arms 12 are preferably each provided with a pair of forwardly projecting ears 29. Extending between each pair of ears is a tube or sleeve 30 around which several turns of the spring 31 are confined. One end of the spring extends downwardly to form the arm 32 which is bent to form a hook 33 at its lower end. As shown in Figure 4, the hook 33 is adapted to be sprung forwardly slightly into engagement with the stem 34 of the wiper 27 to hold the latter against the wind shield. The stem 34 has its upper end bent substantially at a right angle and passed into the hollow of the sleeve 30. The opposite end of the spring extends laterally and downwardly to form an open circular C shaped guard 35 which prevents the wiper stem from slipping from the sleeve, as will be seen.

As it is quite frequently necessary to remove the wipers for replacement or repair, it will be seen that the retaining spring described permits the wipers to be removed readily by merely disengaging the hook 33 from the stem 34 and thereafter rotating the wiper away from the wind shield until the same clears the end of C guard when it can be slid laterally from the sleeve. A new wiper can be inserted by reversing the steps described as will be apparent.

Although I have shown and described certain features of my improvements for the purpose of illustration it will be apparent that various changes may be made therein without departing from the spirit of the invention as defined in the appended claims, such as, for instance, by using a single threaded shaft operated by a reversible motor. The guard 36 need not necessarily be in the form of the letter C but may be given other equivalent shapes but disposed in a corresponding plane.

What I claim is:

1. In combination a wind shield wiper mechanism comprising a wiper arm, said arm having a bearing sleeve, a wiper holding stem having a horizontally disposed upper end portion extending into said sleeve, and a coil spring on the exterior of said sleeve having one end extended and adapted to engage said stem to hold the wiper in contact with the wind shield, the opposite end of the spring being extended to beyond said sleeve to form a guard to prevent the unintentional removal of the stem from the sleeve.

2. In combination a wind shield wiper arm having a horizontally disposed bearing sleeve, a wiper having a stem the upper end of which is disposed in said sleeve, a coiled spring member confined on said sleeve, said spring member having one arm extended downwardly and provided with a hook at its free end for engagement with the stem of said wiper for urging the same into contact with the wind shield, the opposite end of the spring member being extended to the side of the stem farthest removed from said sleeve to form a guard to prevent accidental displacement of the stem from the sleeve, said guard being formed as an arc of circle whereby when said stem is moved away from the wind shield after detaching said hook, said wiper can be removed freely from the sleeve.

3. An article of manufacture comprising a spring having an intermediate coil and two integral end extensions, one of said extensions being disposed at substantially right angles to the axis of the coil and having a hook at its free end, the other extension being disposed substantially parallel to the axis of the coil and terminating in a depending guard in the form of an arc of a circle, the plane of the guard being substantially at right angles to the axis of the coil.

In witness whereof I have subscribed my name.

WILLIAM B. GRAY.